United States Patent [19]

Fujikawa et al.

[11] Patent Number: 4,618,044

[45] Date of Patent: * Oct. 21, 1986

[54] WHEEL HUB CLUTCH ASSEMBLY

[75] Inventors: Motoi Fujikawa, Anjo; Tooru Kagata, Toyota, both of Japan

[73] Assignee: Aisin Seiki Kabushiki Kaisha, Kariya, Japan

[*] Notice: The portion of the term of this patent subsequent to Sep. 3, 2002 has been disclaimed.

[21] Appl. No.: 649,375

[22] Filed: Sep. 11, 1984

[30] Foreign Application Priority Data

Sep. 26, 1983 [JP] Japan .................. 58-148392[U]

[51] Int. Cl.$^4$ ............................................. F16D 43/20
[52] U.S. Cl. ........................................ 192/54; 192/36; 192/93 A; 192/67 R
[58] Field of Search .............. 192/36, 54, 67 R, 93 A

[56] References Cited

U.S. PATENT DOCUMENTS

| | | | |
|---|---|---|---|
| 2,667,252 | 1/1954 | Meyer | 192/67 R |
| 4,159,050 | 1/1979 | Hopkins, Sr. et al. | 192/93 A X |
| 4,281,749 | 8/1981 | Fogelberg | 192/36 |
| 4,287,972 | 9/1981 | Petrak | 192/54 |
| 4,327,821 | 5/1982 | Telford | 192/54 X |
| 4,382,495 | 5/1983 | Fleitas | 192/36 |
| 4,441,597 | 4/1984 | Teraoka | 192/54 X |
| 4,470,491 | 9/1984 | Teraoka | 192/54 X |
| 4,538,714 | 9/1985 | Kagata et al. | 192/93 A X |

FOREIGN PATENT DOCUMENTS

| | | | |
|---|---|---|---|
| 56-90126 | 7/1981 | Japan | 192/36 |
| 2098286 | 11/1982 | United Kingdom | 192/36 |

*Primary Examiner*—Kenneth J. Dorner
*Assistant Examiner*—Dwight G. Diehl
*Attorney, Agent, or Firm*—Burns, Doane, Swecker and Mathis

[57] ABSTRACT

A clutch assembly comprising a cylindrical body having first clutch teeth and fastened to a wheel hub. A sleeve member is fixed to an outer end of a drive axle and is located within the cylindrical body. A clutch member is formed with second clutch teeth and is axially slidably mounted on the sleeve member for rotation therewith. A cam ring operatively coupled with an outer end of a stationary axle tube for the drive axle is rotatable on the sleeve member. A cam follower ring is axially slidably mounted on the sleeve member for rotation therewith. The cam follower ring is cooperable with the cam ring to be displaced toward the clutch member in response to rotation of the drive axle. A connecting member is engaged with the cam follower ring and the clutch member to permit relatively axial movement between the cam follower ring and the clutch member. The cam ring has at least two stages of cam rise face cooperable with the cam follower ring.

5 Claims, 7 Drawing Figures

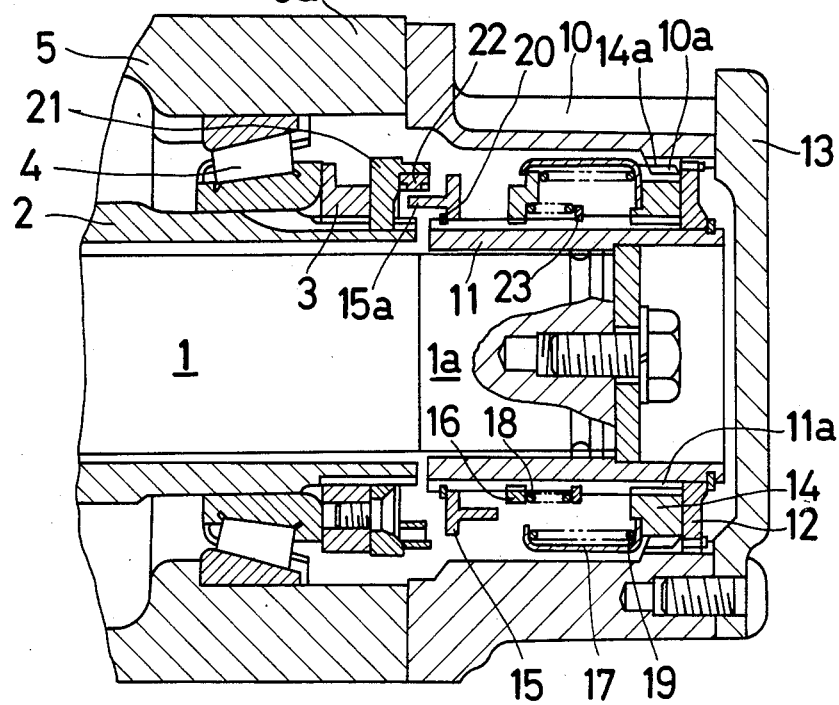
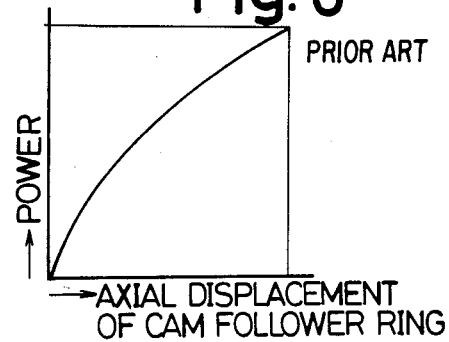
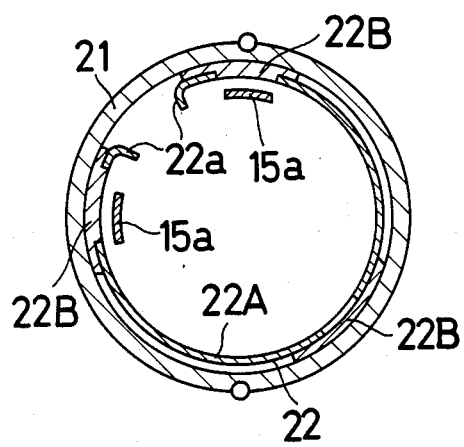
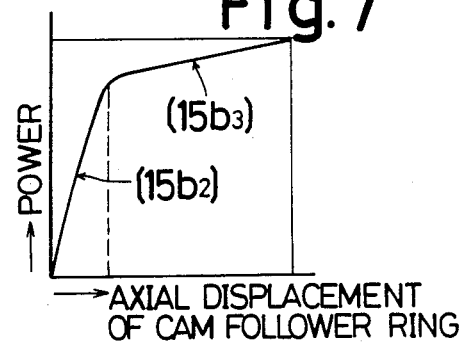

WHEEL HUB CLUTCH ASSEMBLY

BACKGROUND OF THE PRESENT INVENTION

The present invention relates to a wheel hub clutch assembly adapted for use in a four-wheel drive vehicle. More particularly, the present invention relates to a wheel hub clutch assembly for automatically effecting engagement between a drive axle and a wheel hub in response to rotation of the drive axle.

One such wheel hub clutch assembly as described above is set forth in U.S. patent application Ser. No. 06/524,667 filed on Aug. 19, 1983 now U.S. Pat. No. 4,538,714. The wheel hub clutch assembly disclosed in that application comprises a cylindrical body secured to an outer end of a wheel hub, and an inner sleeve member fixedly mounted on an outer projection of the axle by a splined connection. The cylindrical body is integrally formed at its inner peripheral wall with first clutch teeth in the form of an internal spline. In the interior of the cylindrical body, a clutch member, a cam ring, a cam follower ring, a cylindrical connecting member and coil springs are assembled on the sleeve member. A brake member is assembled within a drum which is mounted on an outer end of an axle tube. The cam ring is further provided at its outer end face with a cylindrical portion which is formed with a root, a pair of straight rise cam faces, a pair of flat cam faces and a pair of axial projections upon which a radial projection of the cam follower ring abuts.

In initial operation of the wheel hub clutch assembly, the cam follower ring is axially moved toward the clutch member against one of the coil springs by engagement with one of the straight rise cam faces. The cam follower ring is retained in its displaced position by engagement with one of the flat cam faces.

However, one problem with such a wheel hub clutch assembly is that it may not be easily disengaged between the first clutch teeth and the clutch member. This is a result of the fact that an axial displacement of the clutch member is nearly directly proportional to the power, as shown in FIG. 6, due to the straight rise cam faces.

SUMMARY OF THE INVENTION

It is, therefore, a primary object of the present invention to provide an improved wheel hub clutch assembly which will overcome the problem noted above. To solve this problem and others, the present invention is directed to an improvement of the wheel hub clutch assembly described above, in which the cam rise faces of the cam ring have at least two stages. In a particularly preferred embodiment, two stages of the cam rise face comprise a first stage having a sharp rise (i.e., steep) operating under lower power and a second stage having a loose rise (i.e. flatter or gentle rise) for operating under higher power. With these two stages of the cam rise face, reliable disengagement of the wheel hub clutch assembly is accomplished by disengagement of the first clutch teeth from the clutch member.

BRIEF DESCRIPTION OF THE DRAWINGS

Additional objects and advantages of the present invention will become apparent to those skilled in the art from the following detailed description of the preferred embodiment when taken together with the accompanying drawings wherein, like members bear like reference numerals, and wherein:

FIG. 2 is a cross-sectional view illustrating details of a brake member of the wheel hub clutch assembly;

FIG. 5 is a sectional view of the wheel hub clutch assembly in the engaged position;

FIG. 6 is a graph of the relationship between the power and the axial displacement of the cam ring in a wheel hub clutch assembly of the type described in the above-identified U.S. patent application; and FIG. 7 is a graph of the relationship between the power and the axial displacement of the cam ring in the wheel hub clutch assembly in accordance with the present invention.

DETAILED DESCRIPTION OF THE PREFERRED EMBODIMENT

Figure 1:
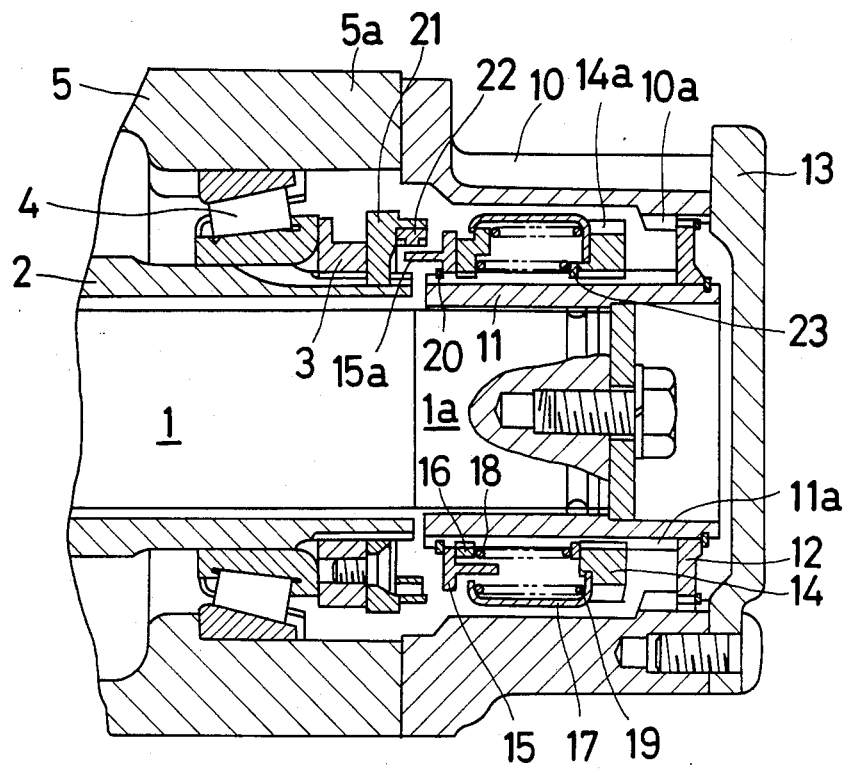
FIG. 1 is a sectional view of a wheel hub clutch assembly in a disengaged position in accordance with the present invention.

With reference to FIG. 1, an automotive vehicle of a four-wheel drive type includes a drive axle 1. The drive axle 1 is rotatably supported in a stationary axle tube or housing 2 and has an external spline 1a at its outer projection. The drive axle 1 is operatively connected at its inner end to a differential gearing (not shown) through a universal joint (not shown). The differential gearing is connected to a prime mover of the vehicle through a transfer mechanism (not shown).

A wheel hub 5 is mounted on the outer end of the axle tube 2 and is rotatably supported in place by tapered roller bearings 4. The roller bearings 4 are fastened in place on the outer end of the axle tube 2 by lock nuts 3. The wheel hub 5 is arranged to be operatively connected to the drive axle 1 through a wheel hub clutch assembly in accordance with the present invention.

The wheel hub clutch assembly is arranged to effect engagement between the drive axle 1 and the wheel hub 5 in response to rotation of the drive axle 1 caused by the transfer mechanism (not shown). The wheel hub clutch assembly comprises a cylindrical body 10 secured to the outer end of the wheel hub 5. An inner sleeve member 11 is fixedly mounted on the outer projection of the drive axle 1 by a splined connection.

The cylindrical body 10 is rotatably supported at its outer end by an annular metal bearing 12 which is rotatably supported on the inner sleeve member 11. A cover plate 13 is secured to the outer end of the cylindrical body 10 to close the interior of the cylindrical body 10. The cylindrical body 10 is integrally formed at its inner peripheral wall with first clutch teeth 10a in the form of an internal spline. In the interior of the cylindrical body 10, an annular clutch member 14, a cam ring 15, a cam follower ring 16, a cylindrical connecting member 17 and first and second coil springs 18, 19 are assembled on the sleeve member 11.

The annular clutch member 14 is integrally formed at its outer periphery with second clutch teeth 14a in the form of an external spline adapted to be engaged with the first clutch teeth 10a during a clutching operation. The annular clutch member 14 has an internal spline in engagement with an external spline 11a of the sleeve member 11 for effecting a drive torque transmitting arrangement between the drive axle 1 and the wheel hub 5 during the clutching operation. The cam ring 15 is rotatably mounted on the inner end portion of the sleeve member 11 and is retained in place by a retainer clip 20.

Figure 3:
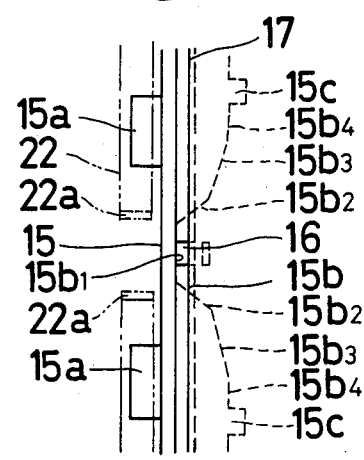
FIG. 3 is an enlarged view illustrating in detail the relationship between a cam ring and a cam follower ring in the disengaged position of the wheel hub clutch assembly.
Figure 4:
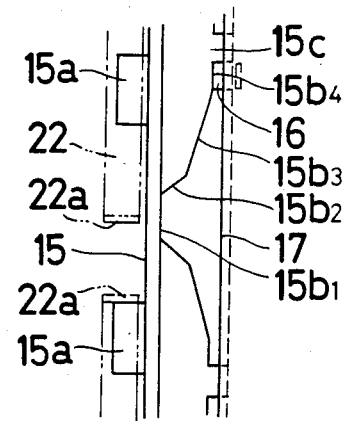
FIG. 4 is an enlarged view illustrating the relationship between the cam ring and the cam follower ring in an engaged position of the wheel hub clutch assembly.

As can be seen in FIGS. 2–4, the cam ring 15 is integrally formed at its one end face with a pair of axial lugs 15a, 15a each of which extends into the interior of an annular brake member 22. The annular brake member 22 is assembled within a drum 21 which is mounted on the outer end of the axle tube 2 and is fastened to the lock nut 3 by screws. The annular brake member 22 is in the form of a spring band 22A which is provided with three circumferentially spaced brake shoes 22B secured thereto. The spring band 22A is formed at its free ends with a pair of lugs 22a, 22a which extend radially inwardly to be selectively engaged with the axial lugs 15a, 15a.

The annular brake member 22 is in frictional engagement with an inner periphery of the drum 21 to produce a frictional drag force. When one of the axial lugs 15a abuts against one of the radial lugs 22a in response to rotation of the drive axle 1, the annular brake member 22 acts to apply a frictional drag force to the cam ring 15 and to cause relative rotation between the cam ring 15 and the cam follower ring 16. The cam ring 15 is further provided at its outer end face with a cylindrical portion 15b which is formed with a root 15b1; a pair of sharp rise cam faces 15b2, 15b2; a pair of gentle rise cam faces 15b3, 15b3; a pair of flat cam faces 15b4, 15b4; and a pair of axial projections 15c, 15c upon which a radial projection of the cam follower ring 16 bears.

The cam follower ring 16 is axially slidably mounted on the sleeve member 11 by a splined connection and is resiliently engaged with the cylindrical portion 15b under the force of a first coil spring 18. Furthermore, the cam follower ring 16 is coupled with the clutch member 14 by a cylindrical connecting member 17. The first coil spring 18 surrounds the sleeve member 11 and has one end engaged with the cam follower ring 16 and the other end engaged with a retainer clip 23 fixed to an intermediate portion of the sleeve member 11.

When the drive axle 1 is subjected to rotation under power, the cam follower ring 16 is axially moved by engagement with the cylindrical portion 15b against the force of the first coil spring 18. In this arrangement, the cylindrical connecting member 17 is arranged to permit relative axial movement between the cam follower ring 16 and the annular clutch member 14. In particular, the connecting member 17 permits axial movement of the cam follower ring 16 toward the annular clutch member. The second coil spring 19 surrounds the first coil spring 18 and is housed within the cylindrical connecting member 17. The second coil spring 19 is engaged at one end thereof with the cam follower ring 16 and at the other end thereof with the annular clutch member 14 through one end of the cylindrical connecting member 17 to resiliently provide an axial space between the cam follower ring 16 and the annular clutch member 14.

Hereinafter the operation of the wheel hub clutch assembly will be described with reference to FIGS. 1–5. When the drive axle 1 is not subjected to rotation under power, the annular clutch member 14, the cam ring 15 and the cam follower ring 16 are in an unlocked position (FIG. 1). In the unlocked position, the second clutch teeth 14a are spaced from the first clutch teeth 10a to permit free rotation of the wheel hub 5 on the axle tube 2 in the two-wheel drive mode. In such a condition, the axial lugs 15a, 15a are spaced from the radial lugs 22a, 22a (FIG. 2) and the cam follower ring 16 is in engagement with the cylindrical portion 15b at the root 15b1.

When the drive axle 1 is subjected to rotation under power in response to operation of the transfer mechanism to provide four wheel drive, one of the axial lugs 15a is brought into engagement with one of the radial lugs 22a to apply a frictional drag force to the cam ring 15 so as to cause relative rotation between the cam ring 15 and the cam follower ring 16.

During this initial operation of the clutch assembly, the cam follower ring 16 is axially moved toward the annular clutch member 14 under lower power against the first coil spring 18 by engagement with one of the sharp rise cam faces 15b2. Thereafter, the cam follower ring 16 is axially moved by engagement with one of the gentle rise cam faces 15b3 under higher power. The cam follower ring 16 is retained in its displaced position by engagement with one of the flat cam faces 15b4. Thus, the annular clutch member 14 is displaced outwardly by the cam follower ring 16 through the second coil spring 19, and the second clutch teeth 14a are brought into engagement with the first clutch teeth 10a.

In the event the outward displacement of the annular clutch member 14 is blocked by abutment of the second clutch teeth 14a against the inner end of the first clutch teeth 10a, compression of the second coil spring 19 preloads the annular clutch member 14. Subsequently, slight relative rotation between the first and second clutch teeth 10a, 14a relieves the blockage, and the outward displacement of the annular clutch member 14 is completed. Thus, the cylindrical body 10 is operatively connected to the sleeve member 11 to drive the wheel hub 5 on the axle tube 2 so as to establish the four-wheel drive. In the engaged position (FIGS. 4 and 5), the cam follower ring 16 is in engagement with the axial projection 15c to rotate therewith.

When the operator desires to establish two-wheel drive, he stops the vehicle and disengages the four-wheel drive under the control of the transfer mechanism. The drive axle 1 is no longer subjected to rotation under power. The operator moves the vehicle in the opposite direction slightly to rotate the sleeve member 11 with the wheel hub 5. The cam ring 15 is applied with a frictional drag force in engagement with the annular brake member 22 to cause relative rotation between the cam follower ring 16 and the cam ring 15.

As a result, the engagement between the cam follower ring 16 and the cylindrical portion 15b is displaced from the flat cam face 15b4 to the root 15b1 successively through the gentle and the sharp rise cam face 15b3, 15b2, respectively, under the load of the first coil spring 18. In this way, when the power goes down only slightly, the axial displacement of the cam follower ring 16 is large (as shown in FIG. 7), because the cam follower ring 16 slides on the gentle rise cam face 15b3. So as the power goes to the lower from the higher level, inward displacement of the annular clutch member 14 and disengagement of the second clutch teeth 14a from the first clutch teeth 10a is ensured.

The principles, preferred embodiment and mode of operation of the present invention have been described in the foregoing specification. However, the invention which is intended to be protected is not to be construed as limited to the particular embodiment disclosed. The embodiment is to be regarded as illustrative rather than restrictive. Variations and changes may be made by others without departing from the spirit of the present invention. Accordingly, it is expressly intended that all such variations and changes which fall within the spirit and scope of the present invention as defined in claims be embraced thereby.

What is claimed is:

1. A wheel hub clutch assembly for effecting engagement between a drive axle and a wheel hub in response to rotation of said drive axle, comprising:
   a cylindrical body with a first clutch element, the cylindrical body being secured to an outer end of said wheel hub;
   a sleeve member fixedly mounted on an outer end of said drive axle for rotation therewith and located within said cylindrical body;
   a clutch member with a second clutch element for engagement with said first clutch element, said clutch member being axially slidably mounted on said sleeve member for rotation therewith;
   cam means operatively coupled with an outer end of a stationary axle tube for said drive axle and rotatable on said sleeve member, said cam means having at least two stages of cam face rise;
   cam follower means axially slidably mounted on said sleeve member for rotation therewith, said cam follower means cooperable with said cam face rise of said cam means to be displaced toward said clutch member in response to rotation of said drive axle;
   a connecting member engaged with said cam follower means and said clutch member, said connecting member permitting relative axial movement between said cam follower means and said clutch member,
   a first spring arranged between said cam follower means and said clutch member for loading said cam follower means toward said cam means, said first spring being cooperable with said connecting member for loading said clutch member for movement away from engagement with said first clutch element; and
   a second spring arranged in parallel with said first spring between said cam follower means and said clutch member for loading said clutch member for movement toward engagement with said first clutch element, said second spring being cooperable with said connecting member for resiliently providing an axial space between said cam follower means and said clutch member.

2. The wheel hub clutch assembly as claimed in claim 1, wherein at least two stages of said cam rise face comprises:
   a first stage having a sharp rise face cooperable with said cam follower means under lower power; and
   a second stage having a gentler rise face than said sharp rise face and being cooperable with said cam follower means under higher power.

3. The wheel hub assembly as claimed in claim 2, further comprising a third stage of said cam face rise having a flat cam face.

4. The wheel hub assembly as claimed in claim 1, further comprising an annular brake member for causing relating rotation between the cam means and the cam follower means.

5. The wheel hub assembly as claimed in claim 1, wherein the connecting member only permits movement of the cam follower means toward said clutch member.

* * * * *